(12) United States Patent
Kaminsky et al.

(10) Patent No.: US 9,736,318 B2
(45) Date of Patent: Aug. 15, 2017

(54) ADAPTIVE VOICE-TEXT TRANSMISSION

(71) Applicant: International Business Machines Corporation, Armonk, NY (US)

(72) Inventors: David L. Kaminsky, Chapel Hill, NC (US); David M. Ogle, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/856,428

(22) Filed: Sep. 16, 2015

(65) Prior Publication Data
US 2017/0078490 A1  Mar. 16, 2017

(51) Int. Cl.
| | |
|---|---|
| H04M 11/06 | (2006.01) |
| H04M 1/725 | (2006.01) |
| H04M 3/487 | (2006.01) |
| G06Q 30/02 | (2012.01) |
| G06F 17/28 | (2006.01) |

(52) U.S. Cl.
CPC ............. *H04M 11/06* (2013.01); *G06F 17/28* (2013.01); *G06Q 30/0267* (2013.01); *H04M 1/7255* (2013.01); *H04M 3/4878* (2013.01)

(58) Field of Classification Search
None
See application file for complete search history.

(56) References Cited

U.S. PATENT DOCUMENTS

| | | | |
|---|---|---|---|
| 6,005,870 A * | 12/1999 | Leung | H04M 3/436 370/466 |
| 7,076,245 B1 | 7/2006 | Satapathy | |
| 8,239,204 B2 | 8/2012 | Da Palma et al. | |
| 8,874,070 B2 | 10/2014 | Basore et al. | |
| 9,380,146 B1 * | 6/2016 | Gopalakrishnan | H04M 1/72552 |
| 2001/0004396 A1 * | 6/2001 | Engelke | H04M 11/066 379/88.01 |
| 2003/0097262 A1 | 5/2003 | Nelson | |
| 2003/0158722 A1 * | 8/2003 | Lord | G06F 17/289 704/3 |
| 2006/0121894 A1 | 6/2006 | Ganesan | |
| 2009/0147778 A1 * | 6/2009 | Wanless | G06Q 30/02 370/389 |
| 2012/0323679 A1 * | 12/2012 | Yang | G06Q 30/0241 705/14.49 |
| 2013/0294593 A1 * | 11/2013 | Xing | G06Q 30/0241 379/114.13 |

* cited by examiner

*Primary Examiner* — Daniel Lai
(74) *Attorney, Agent, or Firm* — Lee Law, PLLC; Christopher B. Lee

(57) ABSTRACT

Responsive to determining to transition a voice call from voice communications over a voice network to streamed text over a packetized data network, a voice conversation correlation identifier is created that identifies the voice call and specifies incoming and outgoing streamed text data as part of the voice call. Additional outgoing speech spoken by a user associated with the voice call is converted to streamed text data. The streamed text data identified by the voice conversation correlation identifier is sent within an outgoing text stream over the packetized data network. Streamed response text data identified by the voice conversation correlation identifier is received within an incoming text stream over the packetized data network. The received streamed response text data within the incoming text stream is converted to speech output as part of the voice call.

17 Claims, 5 Drawing Sheets

ADAPTIVE VOICE-TEXT TRANSMISSION

BACKGROUND

The present invention relates to voice communication technology switching. More particularly, the present invention relates to adaptive voice-text transmission.

A user of a telephone device may initiate a telephone call to another user by dialing a telephone number that rings a telephone device of the other user. Multiple users may also participate in conference calls, such as by all conferences call attendees calling in to a common conference call telephone number. The users may communicate by voice during the respective telephone calls.

SUMMARY

A computer-implemented method includes creating, responsive to determining to transition a voice call from voice communications over a voice network to streamed text over a packetized data network, a voice conversation correlation identifier that identifies the voice call and specifies incoming and outgoing streamed text data as part of the voice call; converting additional outgoing speech spoken by a user associated with the voice call to streamed text data; sending the streamed text data identified by the voice conversation correlation identifier within an outgoing text stream over the packetized data network; receiving streamed response text data identified by the voice conversation correlation identifier within an incoming text stream over the packetized data network; and converting the received streamed response text data within the incoming text stream to speech output as part of the voice call.

A system that performs the computer-implemented method and a computer program product that causes a computer to perform the computer-implemented method are also described.

DETAILED DESCRIPTION

Figure 1:
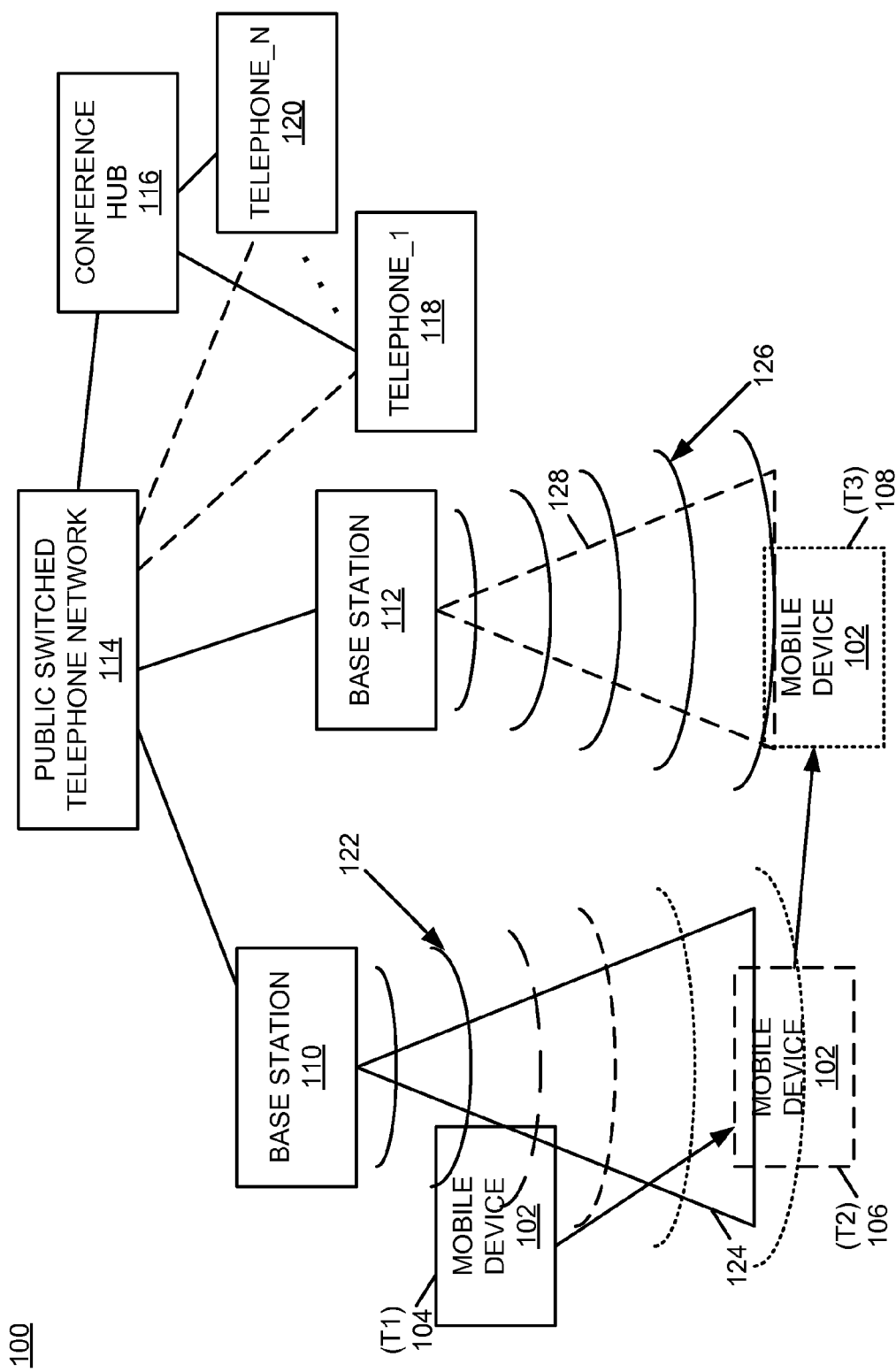
FIG. 1 is a block diagram of an example of an implementation of a system for adaptive voice-text transmission according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides adaptive voice-text transmission. The present technology solves a recognized telephone call connection problem that occurs due to signal strength variations while a caller travels relative to one or more cellular base stations and as calls are switched between cellular base stations, or travels in areas (e.g., overseas) where cellular voice network coverage may be intermittent. The problem manifests itself where the caller's voice may at times be clear to the recipient when audio/voice signal strength is good, while at other times the caller's voice quality may be degraded when the caller's audio/voice signal strength is weak (e.g., low signal strength at fringes of cell regions). The technology described herein solves this recognized problem by providing technology that includes a new form of adaptive and active call telephone switching technology that toggles an active voice telephone call between voice/audio communication and streamed text data communication technologies in response to determining that a signal on a particular voice network is strong and weak, respectively. The streamed text data communication technologies may include technologies such as data network connections with cell towers, Wireless Fidelity (WiFi) networks that may be available in shops and hotels, and other networks capable of supporting streaming text data.

The automated adaptive voice-text transmission described herein is based upon conversion of a user's spoken words during a voice call using voice communications over a voice network to streaming text data that is transmitted over a non-voice-oriented streaming data network. A voice conversation correlation identifier that identifies the voice call and specifies incoming and outgoing streamed text data as part of the voice call may be created in association with a first transition from voice to streamed text data transmission, and may be inserted into the streamed text data to allow the recipient telephone device to correlate the streamed text data with the ongoing voice call. Received response streamed text data may be correlated and converted back to audio output in association with the voice call using the same voice conversation correlation identifier.

Many variations of intermediate text data processing of the converted voice data may be implemented, as described in more detail below, to enhance a user's experience during a voice call that is originated as voice input by the speaker/caller, converted to text for high-bandwidth transmission, and converted back to speech and output as voice audio to the recipient. As such, the present technology may further leverage the streamed text data representation of the voice call to augment the text data that is a part of the voice call. The text data augmentations may include, for example, translation of captured voice data to another language, insertion of advertisements related to a detected subject matter of the voice call, and implementation of other forms of data augmentations within the streamed text data. These data augmentations may be implemented without detected degradation of a voice network signal by transitioning a voice call to streaming text data for purposes of the respective data augmentations.

As such, the technology described herein operates by creating a voice conversation correlation identifier that identifies a voice call and specifies incoming and outgoing streamed text data as part of the voice call responsive to determining to transition the voice call from voice communications over a voice network to streamed text over a packetized data network. Additional outgoing speech spoken by a user associated with the voice call may be converted to streamed text data. The converted streamed text data identified by the voice conversation correlation identifier may be sent within an outgoing text stream over the packetized data network. Streamed response text data identified by the voice conversation correlation identifier may be received within an incoming text stream from the packetized data network. The received streamed response text data within the incoming text stream may be converted to speech output as part of the voice call.

As introduced above, as calls transition between voice and text, the voice conversation correlation identifier may be utilized by both devices to ensure that a unified voice call experience is presented to the respective callers. The voice conversation correlation identifier may be initially transmitted either in-band or out-of-band over a voice network from the originating device to the other device, or may be transmitted as part of the streamed text data itself, as appropriate for the given implementation. The voice conversation correlation identifier may include information that uniquely identifies the voice call. For example, the voice conversation correlation identifier may include the calling and called numbers, a unique global identifier for the call, and any other information appropriate for the given implementation. The unique global identifier within such a text stream may be used by a conferencing device to properly route received text streams to respective devices of parties associated with different telephone calls. The voice conversation correlation identifier may also include language translation identifiers, advertising identifiers/delimiters, and other information usable to process the text data stream.

The technology described herein may leverage real time speech-to-text and text-to-speech conversion technologies to provide voice transmission bandwidth over a streamed data network sufficient to maintain a user perception of a real time voice call. This technology may be implemented in response to signal strength variations during a voice call, or to augment data associated with the call as described above. Regarding the signal strength toggling to streamed data, when the mobile phone detects a weak voice network signal, it may begin transcribing the voice signal to text and transmitting the text over the streamed data network, and the receiving device may process the text back to audio to maintain the real-time nature of the voice call.

When the receiving device determines that a voice call using voice communications over a voice network has been transitioned by a remote mobile device to streamed text data over a data network, the receiving device may begin performing speech-to-text conversions of outbound audio of the telephone call to the remote mobile device. The outbound speech-to-text converted audio may be sent to the remote mobile device over the data network.

A conferencing hub may also participate in the respective conversion operations between voice and text. For example, where multiple parties are participating in a conference call, where the conferencing hub recognizes that a voice call has transitioned to streamed text over a data network, the conferencing hub may read the text and perform the text-to-speech conversion for the conference participants connected to the conferencing hub by a voice line. Additionally, the conferencing hub may perform speech-to-text conversion for outbound audio from the conference participants connected to the conferencing hub by a voice line and may send the outbound speech-to-text converted audio to any mobile devices that are utilizing streaming text data.

The speech-to-text and text-to-speech conversions for voice communications may additionally be selectively used for communications during a call by use of a streamed text voice call configuration option for the users. The use of speech-to-text and text-to-speech conversions for voice communications may be useful both over networks of varying quality, and where anonymity is preferred by one or more of the respective users.

As described above, a voice conversation correlation identifier may be used to correlate the two distinct types of network communications (e.g., voice network and streamed text data network) that occur sequentially in time. Telephone calls may be toggled between a voice network and a text data network routinely to augment the voice content of the telephone calls.

For example, where language translation is of interest to one or more of the callers, additional processing may be added once text is acquired by speech-to-text conversion to translate the language represented within the text to text in a different language. In association with rendering audio of the text by text-to-speech conversion, the speech may be output as audio in the different language to the recipient. As such, persons that do not speak the same language may carry on voice-style communications in different languages and using their own respective native languages. As such, the technology described herein may bridge language differences by providing adaptive voice-text transmission to persons that speak different languages.

As an additional variation on augmenting the voice content of the telephone call, once a voice conversation is represented as text in any language, the subject matter of the conversation may be identified within the text by analysis of the streamed text. An advertisement may be selected in accordance with the identified subject matter of the conversation. The selected advertisement may be inserted into the streamed text. The recipient's device may render the advertisement on a display screen or audibly in association with outputting text-to-speech converted audio of the conversation. Additionally, advertisements may be inserted routinely by iterative conversion between the two types of networks utilized to insert advertisements during use of one of more streamed text data networks at discrete intervals over time.

It should be noted that conception of the present subject matter resulted from recognition of certain limitations associated with degradation of mobile phone telephone call voice quality while a caller travels relative to mobile base stations. For example, it was observed that strength of a cell phone signal may vary widely as one travels, particularly while traveling on highways and in foreign countries. It was further observed that if a caller is on a conference call, other parties on the call may perceive the mobile phone user's voice as clear at certain times, while perceiving the user's voice as garbled/lossy at other times. It was further determined that a problem exists in these scenarios because the traveler/speaker typically is unable to tell when the voice signal degrades. It was additionally determined that the signal strength of a data network does not necessarily coincide with the signal strength of the voice network due to differences in technology used by the various networks/base stations in different locations. The voice network may have weak signal strength at a time that the data network has stronger signal strength, and the opposite may occur at different locations. It was determined from these several observations that new technology that evaluates signal strength of the different voice and data networks accessible by a mobile device, and that toggles an active voice call between the voice network and streamed text over a data network as the respective signal strengths of the different networks vary over time may improve voice communications technology associated with mobile platforms. It was additionally determined that once a voice call is represented in text data, data augmentations may be performed, such as language translation, advertisement insertion, and other forms of data augmentation that may require additional bandwidth. It was further determined that utilizing streamed text over a data network may provide sufficient bandwidth in combination with speech-to-text (send) and text-to-speech (receive) conversion to allow rapid voice communications that exceed capacities of other forms of networks within which text may be used for written communications (e.g., email, text messaging, short message service (SMS), etc.) and to provide for data augmentation as described herein. For example, text messaging and SMS either use in-band or out-of-band signaling with messages limited to one hundred and forty (140) characters, a data limitation with insufficient bandwidth for implementation of the technology described herein. It was determined that the technological improvements described herein may improve voice call quality for callers and may improve the technology and utility of mobile devices themselves. The present subject matter improves mobile device technology by providing for adaptive voice-text transmission, as described above and in more detail below. As such, improved mobile device communications technology may be obtained through use of the present technology.

The adaptive voice-text transmission described herein may be performed in real time to allow prompt transitioning between voice networks and data networks for in-process telephone calls as signal strengths are detected to vary among the respective networks. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for adaptive voice-text transmission. It should be noted that the elements depicted within FIG. 1 are not drawn to any particular scale, and are illustrated relative to one another for ease of description.

A mobile device 102 is illustrated in a number of different locations within FIG. 1. A location identifier 104 (with a solid-line representation of the mobile device 102) represents the mobile device 102 at a first time T1. A location identifier 106 (with dashed-line representation of the mobile device 102) represents the mobile device 102 at a later point in time T2). A location identifier 108 (with a more granular dashed-line representation of the mobile device 102) represents the mobile device 102 at an additional later point in time T3). It is understood that multiple mobile devices may additionally be present within the system 100, though these additional mobile devices are not illustrated to avoid crowding within the drawing.

A base station 110 and a base station 112 are illustrated within FIG. 1. Interactions between the mobile device 102 and the base station 110 and the base station 112 will be described in more detail below. The base station 110 and the base station 112 are illustrated to ultimately connect via a public switched telephone network (PSTN) 114 to a conference hub 116. The conference hub 116 may include a private branch exchange (PBX) or other technology that provides local telephone service to a collection of telephones represented as a telephone_1 118 through a telephone_N 120. Additional intermediate components are not illustrated to reduce complexity within the drawing.

As will be described in more detail below in association with FIG. 2 through FIG. 4B, the mobile device 102 and any of the conference hub 116 and the telephone_1 118 through the telephone_N 120 may each provide automated adaptive voice-text transmission. The automated adaptive voice-text transmission is based upon translation of speech during a telephone call to streaming text data that is transmitted over a non-voice-oriented streaming data network. As such, the present technology may be implemented at a user computing device or server device level, or by a combination of such devices as appropriate for a given implementation. A variety of possibilities exist for implementation of the present subject matter, and all such possibilities are considered within the scope of the present subject matter.

Returning to the description of FIG. 1, the conference hub 116 is shown to interconnect with the telephone_1 118 through the telephone_N 120 for purposes of providing teleconference services to users of the respective telephones and the mobile device 102 (and other mobile devices not illustrated). Again, additional intermediate components are not illustrated to reduce complexity within the drawing. It is understood that the telephone_1 118 through the telephone_N 120 may additionally/alternatively connect directly to the PSTN 114 without use of the conference hub 116, or an additional portion of the PSTN 114 may provide service to the respective telephones as represented by the dashed-line connections between the telephone_1 118 through the telephone_N 120 and the PSTN 114.

Returning to the description of the mobile device 102, as can be seen in FIG. 1, at the time T1 when the mobile device 102 is at the location 104, the mobile device is near the base station 110. For purposes of the present example, the base station 110 is illustrated to provide a cellular voice network 122 represented by the set of arcs within FIG. 1. By use of increasing granularity of dashed-line representations within FIG. 1, the cellular voice network 122 is illustrated to be decreasing in strength as the cellular voice network 122 radiates from the base station 110.

As such, when the mobile device 102 is at the location at T1 represented by the location identifier 104, the mobile device 102 is shown to be within "solid" signal strength of the base station 110 (as represented by at least one solid arc of the set of arcs of the cellular voice network 122 reaching the location of the mobile device 102 represented by the location identifier 104). As such, at the time T1, the mobile device 102 may initiate a voice call with one or more of the telephone_1 118 through the telephone_N 120, either with or without use of the conference hub 116.

As can additionally be seen in FIG. 1, the base station 110 is illustrated to provide a data network 124 represented by a triangle emanating from the base station 110. As can be seen from FIG. 1, the data network 124 is shown in a solid-line representation for purpose of example to indicate that the data network 124 is stronger in signal strength than the cellular voice network 122. However, it is understood that a data network radiating from a base station will also decline in signal strength, though for purposes of the present example, it is presumed that the data network 124 is stronger than the cellular voice network 122 for at least a reasonable duration of time pursuant to the present example.

At the time T2, where the mobile device 102 has moved to the location represented by the location identifier 106, FIG. 1 illustrates that the mobile device 102 is beyond the effective signal strength of the cellular voice network 122. As such, for purposes of the present example, it is presumed that the voice call is still active (no dropped call yet), but that voice communications/signal strength has degraded to a point that the voice call has become audibly unclear (e.g., muddled and/or intermittent).

Because the mobile device 102 determines that the data network 124 has a stronger signal strength than the cellular voice network 122, the mobile device 102 may begin processing to convert voice communications to streamed data communications sent over the data network 124. As such, the voice call may appear to be maintained to the respective end users of the respective devices, though speech-to-text and text-to-speech technology operate to convert between audio and text and vice versa on the respective ends of the telephone call.

At the time T3, where the mobile device 102 has moved to the location represented by the location identifier 108, FIG. 1 illustrates that the mobile device 102 is beyond the effective signal strength of each of the cellular voice network 122 and the data network 124 of the base station 110. However, as can also be seen from FIG. 1, the base station 112 also provides a cellular voice network 126 and a data network 128. It is presumed for purposes of example that a handoff between the data network 124 and the data network 128 successfully occurred to maintain the streamed text data communications associated with the voice call. However, FIG. 1 depicts the data network 128 to have lower signal strength than the cellular voice network 126 at the location of the mobile device 102 represented by the location identifier 108, as represented by the dashed line representation of the data network 128. For example, the data network 128 provided by or available within the area served by the base station 112 may be an older generation data network (e.g., where the base station 112 is in a remote area or a foreign country). Again, the relative strengths of the different types of networks may vary over time and according to locations of mobile devices that are trying to connect via the base station 112.

Given that the mobile device 102 detects that the cellular voice network 126 is stronger in signal strength than the data network 128, the mobile device 102 may initiate processing to convert the streamed text data connection of the voice call back to a voice connection over the cellular voice network 126. Again, these actions may be propagated through the network to either the conferencing hub 116 or directly to the respective telephone(s) 118 to 120.

As such, in response to changes in signal strength between cellular voice networks and data networks, the mobile device 102 may switch back and forth between voice connections and streamed text data connections to provide a continuous voice call experience for users. Accordingly, mobile device usage may be improved under a variety of signal strength conditions and environments.

It should additionally be noted that for implementations that perform language translation using streamed text data, the mobile device 102 may routinely invoke any available streamed data text connection to implement voice calls with language translation. As such, determinations of signal strength variations may be omitted from consideration where there is a certainty of converted text of speech being used to perform a language translation with text-to-speech conversion to a new spoken language.

Further, as described above, advertisements may be inserted into text data for rendering on a destination telephone display or audibly, in any language appropriate for the given implementation. Additionally, advertisements may be inserted in one language, converted to a different language, and rendered in the different language (again either on a telephone display or audibly).

Figure 2:
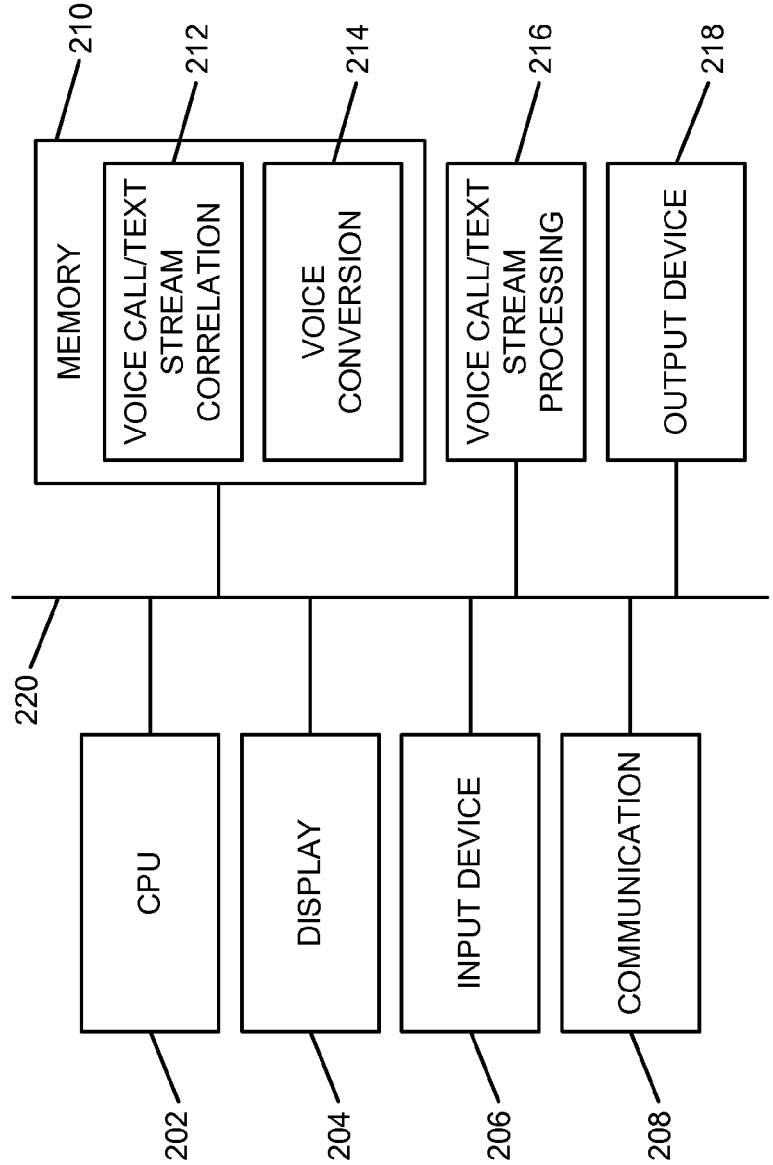
FIG. 2 is a block diagram of an example of an implementation of a core processing module capable of performing adaptive voice-text transmission according to an embodiment of the present subject matter.

FIG. 2 is a block diagram of an example of an implementation of a core processing module 200 capable of performing adaptive voice-text transmission. The core processing module 200 may be associated with any of the mobile device 102, the base station 110 and the base station 112, the conference hub 116, and the telephone_1 118 through the telephone_N 120, as appropriate for a given implementation. As such, the core processing module 200 is described generally herein, though it is understood that many variations on implementation of the components within the core processing module 200 are possible and all such variations are within the scope of the present subject matter. Further, the core processing module 200 may be implemented as an embedded processing device with circuitry designed specifically to perform the processing described herein as appropriate for a given implementation.

Further, the core processing module 200 may provide different and complementary processing of audio and text data in association with voice calls for each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor") provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, voice command processing unit, or any other type of input device by which the user may interact with and respond to information on the display 204.

It should be noted that the display 204 and the input device 206 may be optional components for the core processing module 200 for certain implementations/devices, or may be located remotely from the respective devices and hosted by another computing device that is in communication with the respective devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides hardware, protocol stack processing, and interconnection capabilities that allow the core processing module 200 to communicate with other modules within the system 100. The communication module 208 may include any electrical, protocol, and protocol conversion capabilities useable to provide interconnection capabilities, as appropriate for a given implementation. As such, the communication module 208 represents a communication device capable of carrying out communications with other devices.

A memory 210 includes a voice call/text stream correlation storage area 212 that stores voice call data in either audio format or text format and voice conversation correlation identifiers associated with ongoing calls processed by the core processing module 200. Where the conference hub 116 is processing several voice calls, several sets of call-related data may be stored within the voice call/text stream correlation storage area 212.

The memory 210 also includes a voice conversion area 214. The voice conversion area 214 provides storage and processing space for data conversion to toggle voice calls between audio data and text data formats for transmission. The voice conversion area 214 may also be used to translate text voice data to different languages, and may be used to insert advertisements within the text, each as otherwise described herein. Within these implementations, the voice conversion area 214 may store multiple language dictionaries, advertisement content related to different potential topics of conversation, and other information as appropriate for a given implementation.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A voice call/text stream processing module 216 is also illustrated. The voice call/text stream processing module 216 provides processing capabilities for the core processing module 200, as described above and in more detail below. The voice call/text stream processing module 216 implements the automated adaptive voice-text transmission of the core processing module 200.

It should also be noted that the voice call/text stream processing module 216 may form a portion of other circuitry described without departure from the scope of the present subject matter. The voice call/text stream processing module 216 may form a portion of an interrupt service routine (ISR), a portion of an operating system, or a portion of an application without departure from the scope of the present subject matter. The voice call/text stream processing module 216 may also include an embedded device with circuitry designed specifically to perform the processing described herein as appropriate for a given implementation.

An output device 218 may include a speaker or other audio output device. The output device may be used to output audio of a voice call, advertisement, or other audio to a user of the respective device within which the core processing module 200 is associated.

The CPU 202, the display 204, the input device 206, the communication module 208, the memory 210, the voice call/text stream processing module 216, and the output device 218 are interconnected via an interconnection 220. The interconnection 220 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. Many other possible arrangements for components of the core processing module 200 are possible and all are considered within the scope of the present subject matter. Accordingly, the core processing module 200 may take many forms and may be associated with many platforms.

Figure 3:
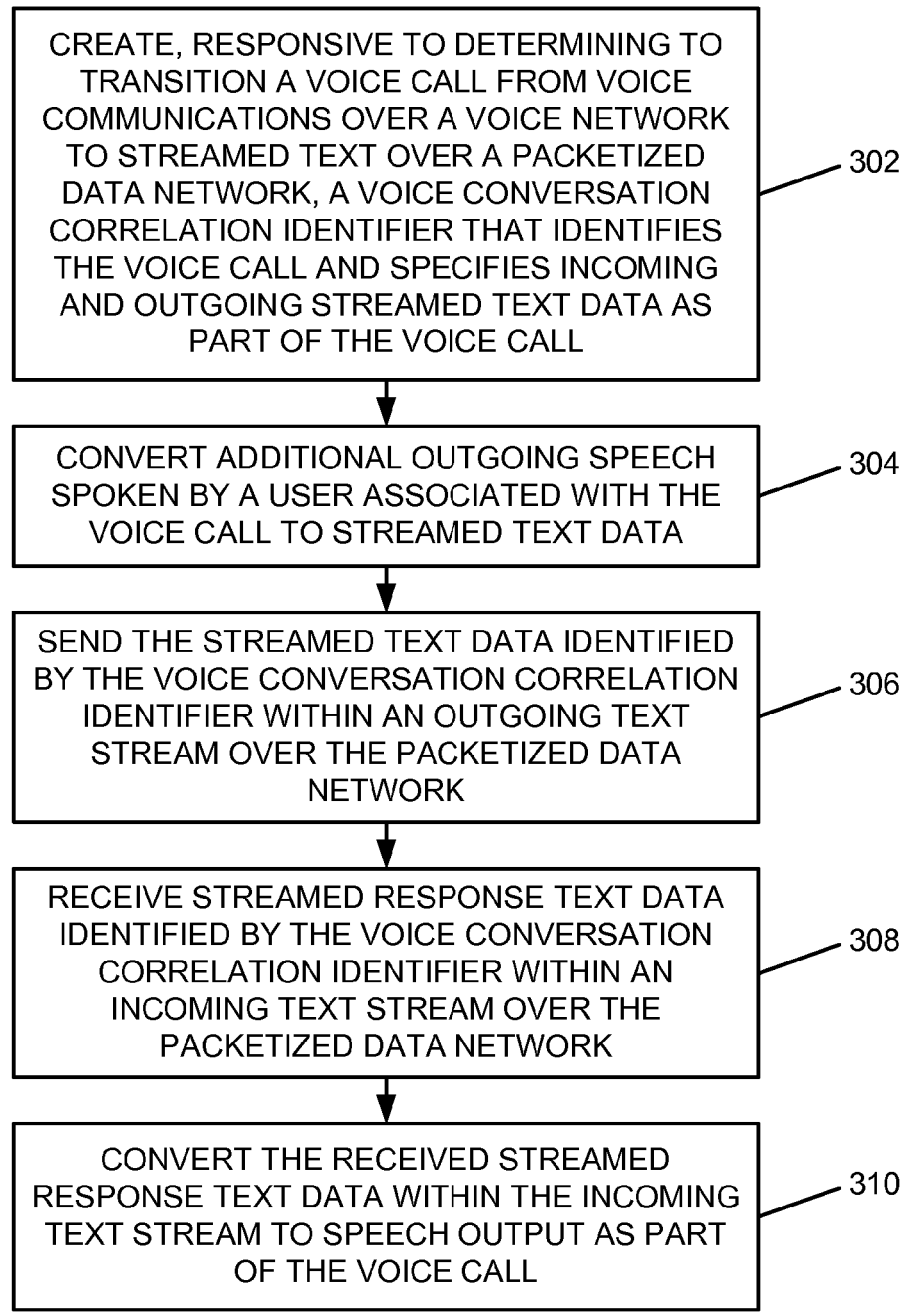
FIG. 3 is a flow chart of an example of an implementation of a process for adaptive voice-text transmission according to an embodiment of the present subject matter.
Figure 4A:
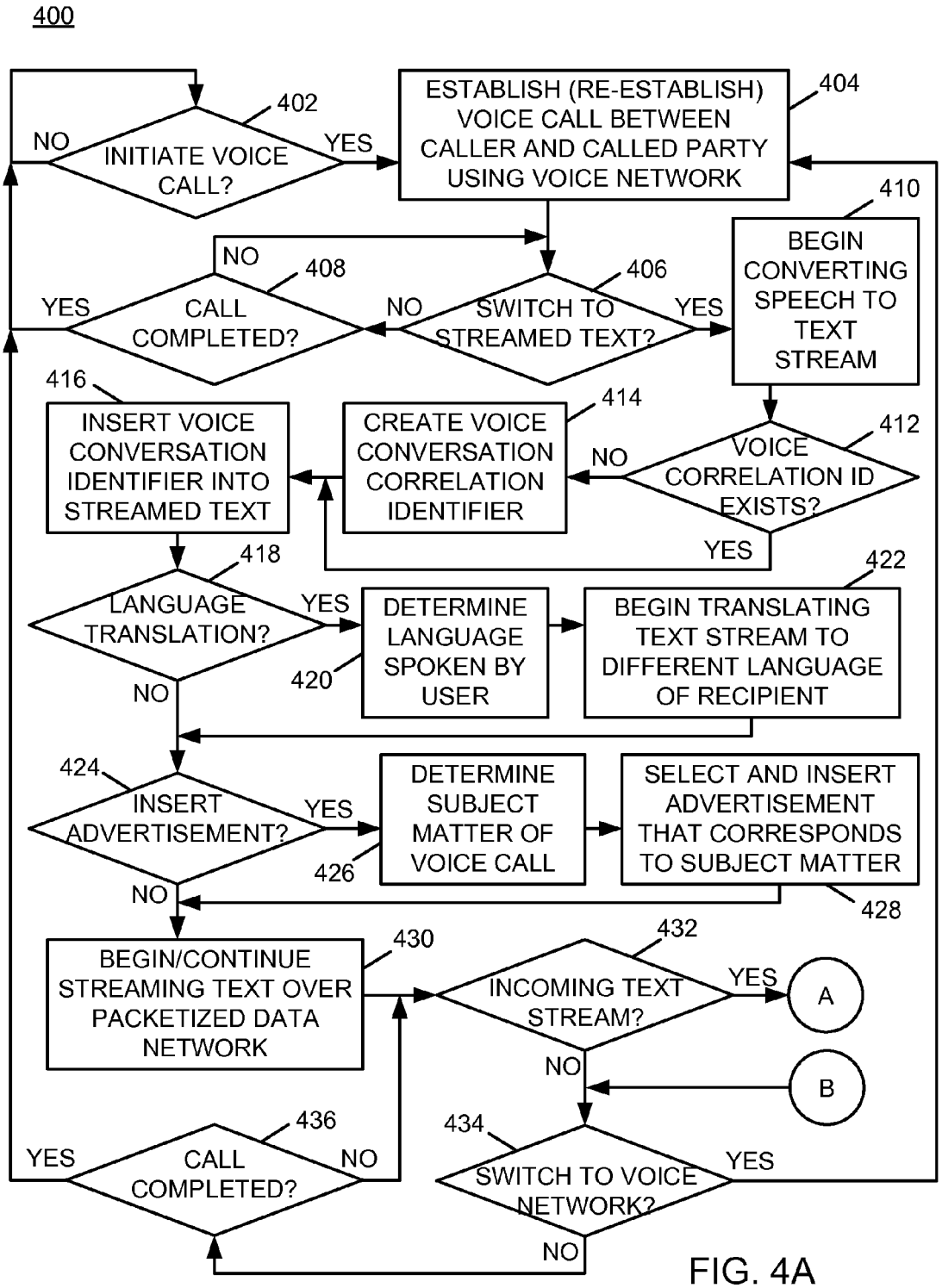
FIG. 4A is a flow chart of an example of an implementation of initial processing within a process for automated adaptive voice-text transmission that toggles voice call processing between voice/audio and streamed text, including conversion between different languages, and that inserts advertisements related to subject matter of voice calls according to an embodiment of the present subject matter.
Figure 4B:
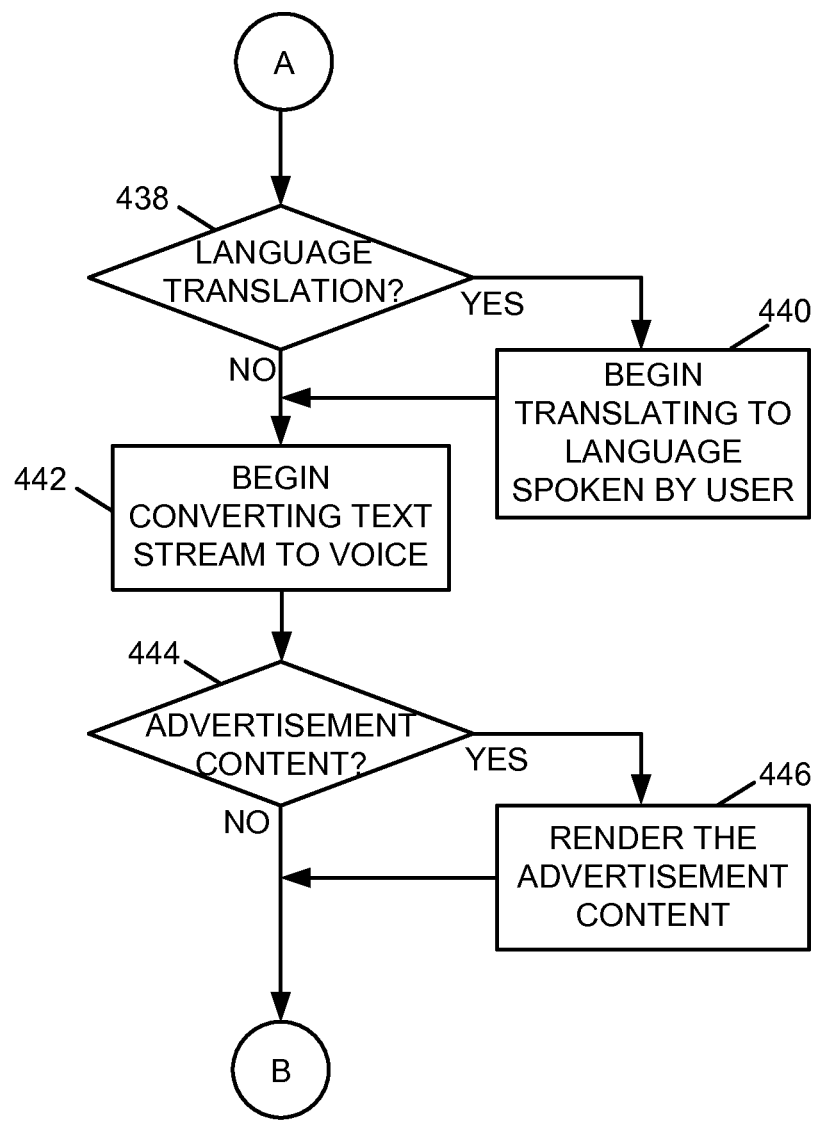
FIG. 4B is a flow chart of an example of an implementation of additional processing within a process for automated adaptive voice-text transmission that toggles voice call processing between voice/audio and streamed text, including conversion between different languages, and that inserts advertisements related to subject matter of voice calls according to an embodiment of the present subject matter.

FIG. 3 through FIG. 4B described below represent example processes that may be executed by devices, such as the core processing module 200, to perform the automated adaptive voice-text transmission associated with the present subject matter. Many other variations on the example processes are possible and all are considered within the scope of the present subject matter. The example processes may be performed by modules, such as the voice call/text stream processing module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 3 is a flow chart of an example of an implementation of a process 300 for adaptive voice-text transmission. The process 300 represents a computer-implemented method of performing the subject matter described herein. At block 302, the process 300 creates, responsive to determining to transition a voice call from voice communications over a voice network to streamed text over a packetized data network, a voice conversation correlation identifier that identifies the voice call and specifies incoming and outgoing streamed text data as part of the voice call. At block 304, the process 300 converts additional outgoing speech spoken by a user associated with the voice call to streamed text data. At block 306, the process 300 sends the streamed text data identified by the voice conversation correlation identifier within an outgoing text stream over the packetized data network. At block 308, the process 300 receives streamed response text data identified by the voice conversation correlation identifier within an incoming text stream over the packetized data network. At block 310, the process 300 converts the received streamed response text data within the incoming text stream to speech output as part of the voice call.

FIGS. 4A-4B illustrate a flow chart of an example of an implementation of process 400 for automated adaptive voice-text transmission that toggles voice call processing between voice/audio and streamed text, including conversion between different languages, and that inserts advertisements related to subject matter of voice calls. The process 400 represents a computer-implemented method of performing the subject matter described herein. At decision point 402, the process 400 makes a determination as to whether to initiate a voice call. The process 400 may determine to initiate a voice call in response to a user dialing a particular telephone number or otherwise as appropriate for a given implementation. In response to determining to initiate a voice call, the process 400 establishes (or re-establishes as described in more detail below) a voice call between a caller and a called party using a voice network at block 404.

At decision point 406, the process 400 makes a determination as to whether to switch to streamed text data to continue the voice call. The determination as to whether to switch to streamed text data to continue the voice call may be made, for example, in response to detection that the signal strength of a voice call has degraded where the call is over a voice network, or may be performed to allow language translation, or may performed in response to a determination to insert advertisements/advertising content associated with a subject matter of a call into the voice call, each as described above and in more detail below. Affirmative processing will be described in more detail below.

As such, in response to determining not to switch to streamed text data to continue the voice call, the process 400 makes a determination at decision point 408 as to whether the call is completed. A call may be completed for example by a user selecting a call "end" feature or hanging up a landline. In response to determining that the call is completed at decision point 408, the process 400 returns to decision point 402 and iterates as described above. Alternatively, in response to determining that the call is not completed at decision point 408, the process 400 returns to decision point 406 and iterates as described above.

Returning to the description of decision point 406, in response to determining to switch to streamed text data to continue the voice call, the process 400 begins converting speech to a text stream of data at block 410. At block 412, the process 400 makes a determination as to whether a voice conversation correlation identifier already exists for the voice call (e.g., where the voice call has been re-established as described in more detail below). In response to determining that a voice conversation correlation identifier does not already exist for the voice call (e.g., this is the first toggle/transition to streamed data), the process 400 creates a voice conversation correlation identifier for the voice call at block 414. In response to creating the voice conversation correlation identifier for the voice call at block 414, or in response to determining at decision point 412 that a voice conversation correlation identifier for the voice call already exists, the process 400 inserts the voice conversation correlation identifier into the streamed text data at block 416.

As described above, the voice conversation correlation identifier may include the calling and called numbers, a unique global identifier for the call, and any other information appropriate for the given implementation. It should additionally be noted that where the toggle to streamed text data is deliberate rather than a result of signal strength loss over a voice network, the voice conversation correlation identifier may alternatively be transmitted over the voice network, either in-band or out-of-band, to alert the recipient device that a transition to streaming data is pending/imminent. In either implementation, the recipient device may correlate the voice call with the subsequent streamed text data representation of the voice call that includes the voice conversation correlation identifier by comparison of the called or calling party information (whichever is not the recipient device) with the ongoing voice call that is active or that was interrupted due to signal strength loss. As such, even where signal strength of a voice network is not available to one of the devices associated with the voice call, sufficient information is available to a device that receives streamed text data to associate the streamed text data with the voice call, and to begin converting the received text data to audio voice output, such as via the output device 218.

With the voice conversation correlation identifier created and inserted into the streamed text data, the process 400 makes a determination at decision point 418 as to whether to perform language translation of the text data to convert the data to a different spoken language text representation. A user request from the user to initiate language translation to a different language relative to a language spoken by the user during the voice call may be detected. The process 400 may determine from either audio or from a configuration option the language spoken by the user during the voice call, and may determine the target language for the language translation. For example, a user may specify by voice a language for translation (e.g., "translate voice call to Spanish," or another language as appropriate for a given implementation) and the process 400 may interpret the target spoken language by audio processing or by parsing the user's voice command that has been converted to text.

In response to determining to perform language translation of the text data to convert the data to a different spoken language text representation at decision point 418, the process 400 determines a language spoken by the user as represented in the streamed text data at block 420. At block 422, the process 400 begins translating the text data stream to a different target spoken language of the intended recipient of the translated streamed text data.

In response to beginning translation of the text data stream to a different target spoken language of the intended recipient of the translated streamed text data at block 422, or in response to determining at decision point 418 not to perform language translation, the process 400 makes a determination at decision point 424 as to whether to insert an advertisement into the streamed text data for presentation to the recipient as either text or audio output. In response to determining to insert an advertisement into the streamed text data, the process 400 determines a subject matter of the voice call at block 426. For example, the process 400 may analyze the subject matter topic of the voice call, which may include parsing the text content of the streamed text data to determine the subject matter of the voice call. At block 428, the process 400 selects and inserts text advertisement content of an advertisement that corresponds to the subject matter of the voice call into the outgoing text stream. In response to selecting and inserting the advertisement that corresponds to the subject matter of the voice call at block 428, or in response to determining at decision point 424 not to insert an advertisement into the streamed text data, the process 400 begins (or continues) streaming text data over a packetized data network to the recipient device at block 430. The streaming text data may be identified by the created voice conversation correlation identifier within the outgoing text stream, and may include sending the translated different language text data stream identified by the voice conversation correlation identifier within an outgoing text stream over the packetized data network.

At decision point 432, the process 400 begins iterative processing by making a determination as to whether an incoming text stream has been received. It should be noted that due to crowding in the drawing, this processing is described at the location represented within FIG. 4A. However, this processing may additionally be performed within the iterative loop formed by decision points 406 and 408 described above to allow a determination of whether a remote device has switched to streamed text data for its outgoing data content. As such, the process 400 may respond to requests from remote devices to switch to streamed text data as well as initiating such requests. As described above, incoming streamed text data may be identified as associated with the ongoing voice call by detection of a voice conversation correlation identifier within a received text data stream that includes the phone number of the local device and a telephone number of another party to the call associated with an ongoing voice call. A unique global identifier within such a text data stream may be used by a conferencing device to properly route received text data streams. The voice conversation correlation identifier may also include language translation identifiers, advertising identifiers/delimiters, and other information usable to process the text data stream. As such, the processing at decision point 432 and affirmative processing thereafter as described in more detail below, may be performed during an active voice call over a voice network, to allow either party to a voice call to switch to streamed text data.

Returning to the description of decision point 432, in response to determining that an incoming stream has not been received, the process 400 makes a determination as to whether to switch the voice call back to a voice network at decision point 434. It should be noted for brevity that an affirmative determination at decision point 434 may cause the process 400 to return to block 404 to re-establish the voice call over a voice network. Switching the voice call back to a voice network may be performed, for example, responsive to completion of processing of an advertisement or responsive to a determination that signal strength on an available voice network is sufficient to utilize a voice channel for the voice call. In response to determining at decision point 434 not to switch the voice call back to a voice network, the process 400 makes a determination at decision point 436 as to whether the voice call (in streamed text) has been completed. Again, for brevity, in response to determining at decision point 436 that the voice call (in streamed text) has been completed, the process 400 returns to decision point 402 and iterates as described above. In response to determining at decision point 436 that the voice call has not been completed, the process 400 returns to decision point 432 and iterates as described above.

Returning again to the description of decision point 432, in response to determining that an incoming text stream has been received, the process 400 transitions to the processing shown and described in association with FIG. 4B.

FIG. 4B illustrates additional processing associated with the process 400 for automated adaptive voice-text transmission that toggles voice call processing between voice/audio and streamed text, including conversion between different languages, and that inserts advertisements related to subject matter of voice calls. FIG. 4B illustrates processing of incoming streamed text data by the process 400. At decision point 438, the process 400 makes a determination as to whether to translate a language represented within the received streamed text data to a language of the recipient device user. The determination of whether to translate a language represented within the received streamed text to a language of the recipient device user may be performed by determining that text represented in a different language from a language spoken by the user has been received. As described above, language translation may be identified within the voice conversation correlation identifier, or may be identified by text recognition relative to a configured language of the recipient device user. In response to determining to perform language translation, the process 400 begins translating the received streamed text data to the appropriate language at block 440. As such, the process 400 performs a language conversion of the text represented in the different language to the language spoken by the recipient device user. The received streamed response text data that is converted to speech output may then include the language-converted text to render the output in the language of spoken by the recipient device user. In response to beginning translation activities at block 440, or in response to determining not to perform language translation at block 438, the process 400 begins converting the text stream to voice/audio output at block 442.

At decision point 444, the process 400 makes a determination as to whether advertisement content has been identified within the streamed text data associated with a subject matter of the voice call. As described above, the voice conversation correlation identifier may include information that identifies/delimits advertisement content. In response to determining that advertisement content has been identified within the streamed text data, the process 400 renders the advertisement content at block 446. Rending the advertisement content may include rendering text output, audio output, or other forms of output of the advertisement content. In response to rendering the advertisement content at block 446, or in response to determining at decision point 444 that no advertisement content has been identified within the streamed text data, the process 400 returns to processing described in FIG. 4A at decision point 434. The process 400 iterates as described above.

It should additionally be noted that the process 400 is described as a single process for ease of description. However, the process 400 may be partitioned into separate receive and transmission processes that operate concurrently, as appropriate for the given implementation.

As described above, the process 400 toggles a voice call between a voice network and a data network to transition the voice call between spoken audio and streamed text data, respectively. The toggling may be performed as a result of variations over time in voice network signal strength, to insert advertisements, and to translate between spoken languages for users. As such, the technology described herein provides a flexible platform by which voice call technology itself may be improved.

As described above in association with FIG. 1 through FIG. 4B, the example systems and processes provide adaptive voice-text transmission. Many other variations and additional activities associated with adaptive voice-text transmission are possible and all are considered within the scope of the present subject matter.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention. The subject matter was described to explain the principles of the invention and the practical application, and to enable others of ordinary skill in the art to understand the invention for various embodiments with various modifications as are suited to the particular use contemplated.

What is claimed is:

1. A computer-implemented method, comprising:
    creating, responsive to determining to transition a voice call from voice communications over a voice network to streamed text over a packetized data network, a voice conversation correlation identifier that identifies the voice call and specifies incoming and outgoing streamed text data as part of the voice call;
    converting additional outgoing speech spoken by a user associated with the voice call to streamed text data;
    sending the streamed text data identified by the voice conversation correlation identifier within an outgoing text stream over the packetized data network;
    receiving streamed response text data identified by the voice conversation correlation identifier within an incoming text stream over the packetized data network; and
    converting the received streamed response text data within the incoming text stream to speech output as part of the voice call;
    where receiving the streamed response text data identified by the voice conversation correlation identifier within the incoming text stream over the packetized data network comprises one of:
        receiving text advertisement content within the received streamed response text data within the incoming text stream associated with a subject matter of the voice call and rendering the text advertisement content during the voice call; or
        receiving text represented in a different language from a language spoken by the user and performing a language conversion of the text represented in the different language to the language spoken by the user, where the received streamed response text data converted to the speech output comprises the language-converted text.

2. The computer-implemented method of claim 1, where:
    determining to transition the voice call from voice communications over the voice network to the streamed text over the packetized data network comprises detecting a user request from the user to initiate language translation to the different language relative to the language spoken by the user during the voice call;
    converting additional outgoing speech spoken by the user associated with the voice call to the streamed text data further comprises translating the streamed text data to the different language; and
    sending the streamed text data identified by the voice conversation correlation identifier within the outgoing text stream over the packetized data network comprises sending the translated different language streamed text data identified by the voice conversation correlation identifier within the outgoing text stream over the packetized data network.

3. The computer-implemented method of claim 1, where determining to transition the voice call from the voice network to the streamed text over the data network comprises:
    detecting signal degradation of the voice network.

4. The computer-implemented method of claim 1, where determining to transition the voice call from voice communications over the voice network to the streamed text over the packetized data network comprises:
    determining to insert an outgoing advertisement into the voice call; and
    inserting outgoing text advertisement content of the outgoing advertisement into the outgoing streamed text data.

5. The computer-implemented method of claim 1, further comprising:
    analyzing a subject matter topic of the voice call;
    selecting advertisement content that corresponds to the subject matter topic of the voice call; and
    inserting outgoing text advertisement content of the selected advertisement content into the outgoing streamed text data.

6. The computer-implemented method of claim 1, further comprising:
    switching from the streamed text over the packetized data network back to the voice communications over the voice network in response to determining that signal strength on an available voice network is sufficient to utilize the voice communications for the voice call.

7. A system, comprising:
    a communication device; and
    a processor programmed to:
        create, responsive to determining to transition a voice call from voice communications over a voice network to streamed text over a packetized data network, a voice conversation correlation identifier that identifies the voice call and specifies incoming and outgoing streamed text data as part of the voice call;
        convert additional outgoing speech spoken by a user associated with the voice call to streamed text data;
        send, via the communication device, the streamed text data identified by the voice conversation correlation identifier within an outgoing text stream over the packetized data network;
        receive, via the communication device, streamed response text data identified by the voice conversation correlation identifier within an incoming text stream over the packetized data network; and
        convert the received streamed response text data within the incoming text stream to speech output as part of the voice call;
        where, in being programmed to receive, via the communication device, the streamed response text data identified by the voice conversation correlation identifier within the incoming text stream over the packetized data network the processor is programmed to one of:
            receive text advertisement content within the received streamed response text data within the incoming text stream associated with a subject matter of the voice call and rendering the text advertisement content during the voice call; or receive text represented in a different language from a language spoken by the user and performing a language conversion of the text represented in the different language to the language spoken by the user, where the received streamed response text data converted to the speech output comprises the language-converted text.

8. The system of claim 7, where:

in being programmed to determine to transition the voice call from voice communications over the voice network to the streamed text over the packetized data network, the processor is programmed to detect a user request from the user to initiate language translation to the different language relative to the language spoken by the user during the voice call;

in being programmed to convert additional outgoing speech spoken by the user associated with the voice call to the streamed text data, the processor is further programmed to translate the streamed text data to the different language; and in being programmed to send, via the communication device, the streamed text data identified by the voice conversation correlation identifier within the outgoing text stream over the packetized data network, the processor is programmed to send the translated different language streamed text data identified by the voice conversation correlation identifier within the outgoing text stream over the packetized data network.

9. The system of claim 7, where, in being programmed to determine to transition the voice call from the voice network to the streamed text over the data network, the processor is programmed to one of:

detect signal degradation of the voice network; or determine to insert an outgoing advertisement into the voice call and insert outgoing text advertisement content of the outgoing advertisement into the outgoing streamed text data.

10. The system of claim 7, where the processor is further programmed to:

analyze a subject matter topic of the voice call;

select advertisement content that corresponds to the subject matter topic of the voice call; and insert outgoing text advertisement content of the selected advertisement content into the outgoing streamed text data.

11. The system of claim 7, where the processor is further programmed to:

switch from the streamed text over the packetized data network back to the voice communications over the voice network in response to determining that signal strength on an available voice network is sufficient to utilize the voice communications for the voice call.

12. A computer program product, comprising:

a computer readable storage medium having computer readable program code embodied therewith, where the computer readable storage medium is not a transitory signal per se and where the computer readable program code when executed on a computer causes the computer to:

create, responsive to determining to transition a voice call from voice communications over a voice network to streamed text over a packetized data network, a voice conversation correlation identifier that identifies the voice call and specifies incoming and outgoing streamed text data as part of the voice call;

convert additional outgoing speech spoken by a user associated with the voice call to streamed text data;

send the streamed text data identified by the voice conversation correlation identifier within an outgoing text stream over the packetized data network;

receive streamed response text data identified by the voice conversation correlation identifier within an incoming text stream over the packetized data network; and convert the received streamed response text data within the incoming text stream to speech output as part of the voice call;

where, in causing the computer to receive the streamed response text data identified by the voice conversation correlation identifier within the incoming text stream over the packetized data network, the computer readable program code when executed on the computer causes the computer to one of:

receive text advertisement content within the received streamed response text data within the incoming text stream associated with a subject matter of the voice call and rendering the text advertisement content during the voice call; or receive text represented in a different language from a language spoken by the user and performing a language conversion of the text represented in the different language to the language spoken by the user, where the received streamed response text data converted to the speech output comprises the language-converted text.

13. The computer program product of claim 12, where:

in causing the computer to determine to transition the voice call from voice communications over the voice network to the streamed text over the packetized data network, the computer readable program code when executed on the computer causes the computer to detect a user request from the user to initiate language translation to the different language relative to the language spoken by the user during the voice call;

in causing the computer to converting additional outgoing speech spoken by the user associated with the voice call to the streamed text data, the computer readable program code when executed on the computer further causes the computer to translate the streamed text data to the different language; and in causing the computer to send the streamed text data identified by the voice conversation correlation identifier within the outgoing text stream over the packetized data network, the computer readable program code when executed on the computer causes the computer to send the translated different language streamed text data identified by the voice conversation correlation identifier within the outgoing text stream over the packetized data network.

14. The computer program product of claim 12, where, in causing the computer to determine to transition the voice call from the voice network to the streamed text over the data network, the computer readable program code when executed on the computer causes the computer to:

detect signal degradation of the voice network.

15. The computer program product of claim 12, where, in causing the computer to determine to transition the voice call from voice communications over the voice network to the streamed text over the packetized data network, the computer readable program code when executed on the computer causes the computer to:

determine to insert an outgoing advertisement into the voice call; and insert outgoing text advertisement content of the outgoing advertisement into the outgoing streamed text data.

16. The computer program product of claim 12, where the computer readable program code when executed on the computer further causes the computer to:

analyze a subject matter topic of the voice call;

select advertisement content that corresponds to the subject matter topic of the voice call; and insert outgoing text advertisement content of the selected advertisement content into the outgoing streamed text data.

17. The computer program product of claim 12, where the computer readable program code when executed on the computer further causes the computer to:

switch from the streamed text over the packetized data network back to the voice communications over the voice network in response to determining that signal strength on an available voice network is sufficient to utilize the voice communications for the voice call.

\* \* \* \* \*